Figure 1:
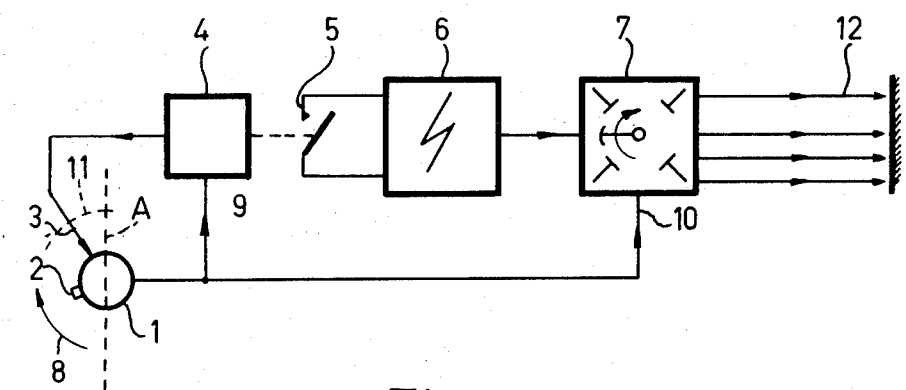

United States Patent [19]
Korteling

[11] 3,799,136
[45] Mar. 26, 1974

[54] METHOD OF, AND APPARATUS FOR IGNITION TIMING IN INTERNAL COMBUSTION ENGINES

[75] Inventor: Aart Gerrit Korteling, Emmasingel, Eindhoven, Netherlands

[73] Assignee: U.S. Phillips Corporation, New York, N.Y.

[22] Filed: June 21, 1971

[21] Appl. No.: 154,815

[30] Foreign Application Priority Data
June 20, 1970 Netherlands................ 7009086

[52] U.S. Cl.... 123/148 E, 123/146.5 A, 123/117 R
[51] Int. Cl............................................. F02p 5/04
[58] Field of Search................ 123/148 E, 146.5 A

[56] References Cited
UNITED STATES PATENTS

| 3,660,689 | 5/1972 | Oishi et al. | 123/148 E |
|---|---|---|---|
| 3,454,871 | 7/1969 | Nolting | 123/148 E |
| 3,418,989 | 12/1968 | Silverman | 123/148 E |
| 3,592,178 | 7/1971 | Schiff | 123/148 E |
| 3,314,407 | 4/1967 | Schneider | 123/148 E |
| 2,852,590 | 9/1958 | Fremon | 123/148 E |
| 3,361,123 | 1/1968 | Kasama et al. | 123/148 E |
| 3,521,611 | 7/1970 | Finch | 123/148 E |

OTHER PUBLICATIONS
"Electronically Controlling Auto's Engine Spark" A. R. Hayes Electronics, Dec. 28, 1964, p. 43–44.

*Primary Examiner*—Laurence M. Goodridge
*Assistant Examiner*—Cort Flint
*Attorney, Agent, or Firm*—Frank R. Trifari

[57] ABSTRACT

The ignition of a gas mixture in an internal combustion engine must take place at a given instant before the top dead centre is reached in the compression stroke. The invention provides a method and an apparatus in which the time interval between the ignition instant and the top dead centre is measured and is maintained constant in a control circuit, using as a reference, for example, a fixed time period from a timer. Data are obtained from a crankshaft transducer, and an output signal is delivered for controlling a contact breaker of the high-tension ignition system of the engine. Vacuum advance or other external influences are obtainable by changing the reference time or by adapting the measuring parameters.

12 Claims, 5 Drawing Figures

PATENTED MAR 26 1974 3,799,136

SHEET 1 OF 3

*INVENTOR.*
AART GERRIT KORTELING
BY
*AGENT*

METHOD OF, AND APPARATUS FOR IGNITION TIMING IN INTERNAL COMBUSTION ENGINES

The present invention relates to a method of timing the ignition of the gas mixture in an internal combustion engine, in which method a signal is derived from the crankshaft of the engine and a contact breaker is operated for so actuating the ignition system that the ignition of the gas mixture takes place at an instant which precedes the reaching of top dead-centre of each compression stroke by a desired period of time. This may be accomplished by making a first determination of the position of the piston during the compression stroke before the desired ignition instant, and a second determination of the piston position near the top dead centre, the ignition instant being deduced from the first position determination by a delay circuit. The invention also relates to an apparatus for carrying out the method.

Investigations have shown that some time elapses before a combustible gas mixture is completely burning when the ignition, and hence the flame front, start from a given point. This phenomenon also occurs in the ignition of the gas mixture in the combustion chambers of an engine, in which, for example, the combustible gas mixture is introduced into a cylinder through valves, then is compressed by a piston, is ignited by a spark plug and as a result produces a rise in pressure which in the subsequent power stroke is converted into kinetic energy.

For maximum efficiency, in the cylinder-piston system generally, maximum pressure must be reached at an instant at which the piston has just passed top dead centre. Hence, ignition of the gas mixture will, in substantially all cases, have to take place before the piston reaches top dead centre.

Therefore, usually there is derived from the position of the piston some information which initiates ignition at the correct point. This information is generally derived from a shaft coupled with the crankshaft of the engine because the crankshaft receives the linear displacement of the piston via the connecting rod. By providing the shaft with cams which in predetermined positions close or open a contact breaker, a high-tension circuit may be actuated which at the correct point in the compression stroke produces ignition sparks at electrodes disposed in the combustion chamber of the engine, thereby producing the desired combustion effect.

It is also known that the rapidity of the combustion in such a combustion chamber depends on several parameters, such as the shape of the chamber, the placement of the spark plug, the composition of the gas mixture (rich or poor), after glowing particles, degree of filling, turbulence, etc. Some of these parameters may be influenced by the particular construction of the engine, but other parameters depend upon external conditions.

However, from the above discussion two important features emerge:

1. complete combustion immediately after the top dead centre, i.e. a mechanical information which may be deduced from the crankshaft,
2. a certain inflammation time from the ignition instant to the instant of the complete burning, i.e. a time information.

This inflammation period could be derived from the crankshaft position if the crankshaft has a fixed speed. This is the case in an engine running with a fixed number of revolutions per unit time, delivers a constant power and is started by an auxiliary unit which brings the motor up to this speed. Practice shows that this is almost never the case. For example, the speed of an internal combustion engine used in a motorcar varies widely, depending upon the driving conditions and the power requirements.

Hence, it is common practice to initiate the ignition at an instant which precedes the top dead centre by a desired period, i.e. at low speeds immediately before the top dead centre is reached, and at high speeds a comparatively large distance, in terms of length of piston stroke or angular displacement of the crankshaft, before the top dead centre. Therefore, with increasing speed an ignition advance mechanism must be provided which receives its information from the crankshaft, namely the speed of the crankshaft.

It is known to use a centrifugal governor for this purpose which at an increased speed, rotates the platform on which the contact breaker is mounted so that the cam mounted on the crank shaft actually advances the opening of the contact breaker, with consequent early production of sparks at the spark plug. This "advance" is to be understood to mean a number of crankshaft degrees earlier, for naturally the object is to get a more or less constant inflammation time. In some embodiments, the centrifugal governor contains various springs to produce a specific non-linear characteristic, resulting in a correct instant of ignition for each speed. This may be necessary when the aforementioned parameters exert a strong influence. The functional relationship between the number of degrees of the ignition advance versus speed will then not be linear, which means that the inflammation time is not constant at different speeds.

A disadvantage of such a mechanical method is that the accuracy depends upon spring properties, revolving components, play and backlash of shafts and rods, and that the variation in time and the wear of such a mechanism are large.

It is also known, see for example the article "Electronically controlling auto's engine spark" by A.R. Hayes in "Electronics", Dec. 28, 1964, page 43 et seq., to perform a first position determination during the compression stroke before the desired ignition instant by mounting a pickup at a position a fixed number of degrees in advance of top dead centre. The information from this pickup triggers a delay circuit in the form of a monostable multivibrator. The trailing edge of the output pulse determines the ignition instant. This trailing edge is displaceable in time by means of a signal which depends on the engine speed. A second pickup for a second position determination mounted near top dead centre determines the maximum length of the delay pulse in order to obtain a suitable ignition instant when the motor is started.

A disadvantage of this system is that there is no time reference. The ignition instant depends upon a monostable multivibrator subject to inherent errors and upon the measurement of the speed of the engine subject to inherent errors, while there is no reference to top dead centre.

It is an object of the present invention to obviate the said disadvantages.

A method of timing the ignition of the gas mixture in an internal combustion engine of the type described at the beginning of this specification is characterized in that the period of time between the ignition instant and a second position determination is measured, a measuring quantity being derived which has a given relationship with the said time period and is compared with a reference quantity. In the case of a deviation therebetween the said delay circuit is controlled so as to provide a compensating effect.

The basic principle underlying the invention is to use time as the standard and to compare it with a reference. This enables a higher control accuracy to be achieved.

According to an advantageous aspect of another method according to the invention, the desired period may be influenced by varying the reference quantity.

By adapting the reference quantity in accordance with external parameters, various desired optimal conditions may readily be obtained such as for example, additional accelerating power in motor cars, adaptation to the temperature or pressure of the air induced or to a mixing ratio, avoidance of air pollution, as the case may be manual regulation when changing to another type of fuel, and better control by influencing the engine speed.

In another method according to the invention the desired period may be influenced by altering the parameters of the respective relationship when measuring the period. Instead of a linear relationship between the number of degrees of advance and the speed an advantageous matched relationship is obtainable by so performing the measurement of the period elapsing between the ignition instant and the second position determination that, for example, a parameter of the measuring circuit is influenced by a signal derived from the speed of the engine.

By digitizing the various measurements and comparisons by means of pulses a simple and reliable circuit arrangement may be used. For this purpose, a further method according to the invention is characterized in that the first and the second position determinations are formed by the leading and trailing edges, respectively, of a position pulse which is applied both to the delay circuit, which then will delay in time the leading edge only, and to a pulse generator, which is triggered by the trailing edge and then will produce a reference pulse the duration of which determines the reference quantity. The reference pulse and the output pulse of the delay circuit then applied to a pulse width comparison device, which controls the delay, and to an or-gate which operates the contact breaker.

The apparatus for carrying out the method includes a crankshaft transducer which comprises a disc-shaped part adapted to be secured to the crankshaft and a pick-up part adapted to be secured to the motor casing. The disc-shaped part includes sectors having arclengths which correspond to the desired angle determinations. The pick-up part is disposed close to the disc-shaped part and detects the presence of a sector in a manner such that the position pulse can be taken from its output. The apparatus further comprises an amplifier for amplifying the position pulse, a time delay circuit connected to the output of the amplifier for delaying the leading edge of the position pulse, and a reference pulse generator having a trigger input connected to the output of the amplifier. The apparatus is characterized in that an output of the reference pulse generator is connected to an or-gate and also to a first input of a pulse width comparison circuit, the second input of which is connected to the output of the time delay circuit. The output of the delay circuit is also connected to the or-gate and the output of the pulse width comparison device is connected to a control input of the time delay circuit.

The apparatus for carrying out one of the abovementioned methods, includes a crankshaft transducer which delivers a signal corresponding to the first and second position determinations to an amplifier. The output of the amplifier is connected to a time delay circuit, the output of which is connected to the device for controlling the contact breaker. This apparatus is characterized in that this output is also connected to a time measuring circuit which converts the period elapsing between the ignition instant and the second position determination into a measuring quantity. The apparatus also includes a reference source which delivers the reference quantity to a first input of a comparison device, a second input of which is connected to the output of the time measuring circuit for the measuring quantity. The comparison device delivers an output signal which corresponds to the difference between the reference quantity and the measured quantity at an output which is connected to a control input of the time delay circuit in order to control the time delay so as to provide a compensating effect.

The said reference source may advantageously be a voltage or an electric current, but also a charge which is taken from or supplied to a capacitor.

The crankshaft transducer may be any transducer capable of distinguishing angles: an elongated projection on the shaft which opens or closes a switch, a magnet on the shaft which operates a reed-type relay, induces a voltage in a coil, causes a Hall plate to produce a voltage or varies the value of a magneto-resistor, or a disc in which appropriate openings have been formed to transmit oscillator fields or light.

The reference pulse generator used may deliver a pluse-shaped reference time which may be influenced by the vacuum in the induction manifold of the engine so that the accelerating power is increased. In the case of an electronic timer comprising resistors and capacitors, a resistor may include a part which is disposed in the induction manifold and has a negative or positive temperature coefficient, such as is described, for example, in the published German Patent application No. 1,109,953 for a petrol injection system.

The contact breaker may be a fast mechanical switch, for example, a reed-type relay, but it may alternatively be a transistor or thyristor circuit when the ignition system of the engine is entirely electronic.

Figure 2:
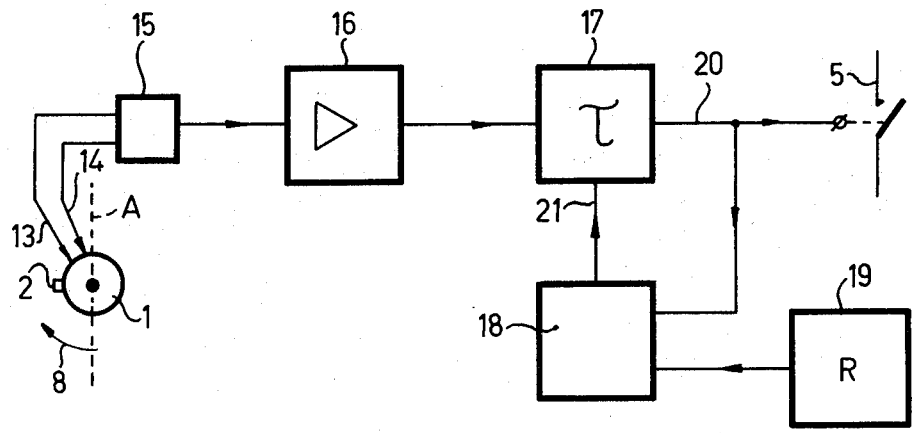
Figure 3:
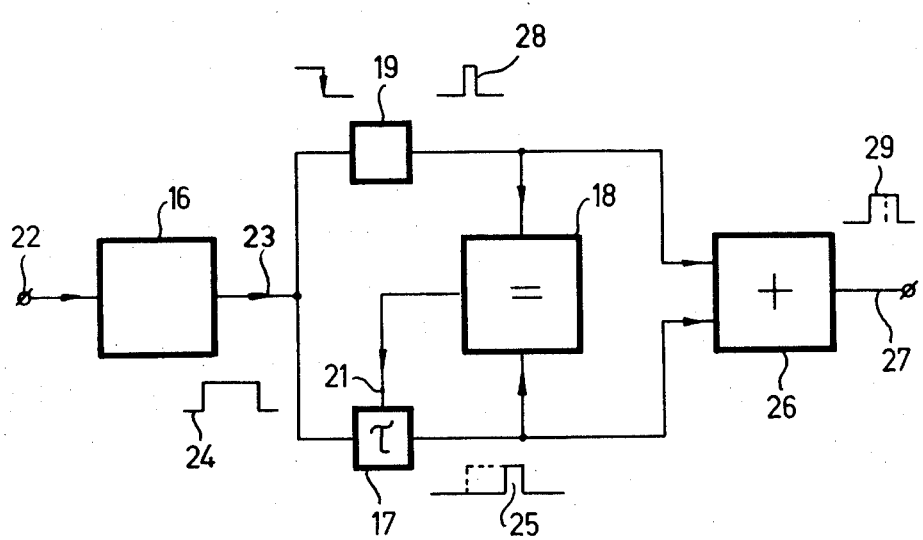
Figure 4:
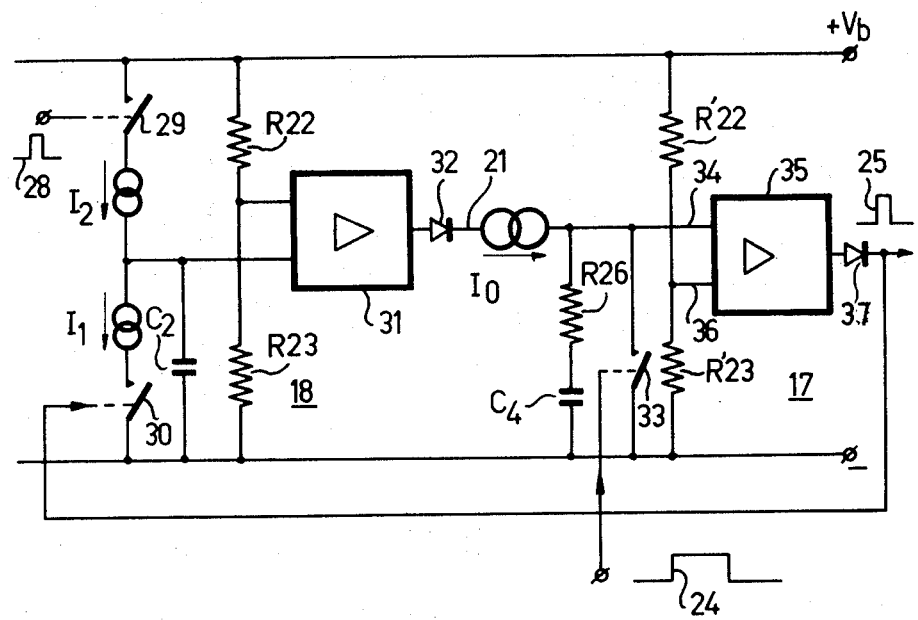
Figure 5:
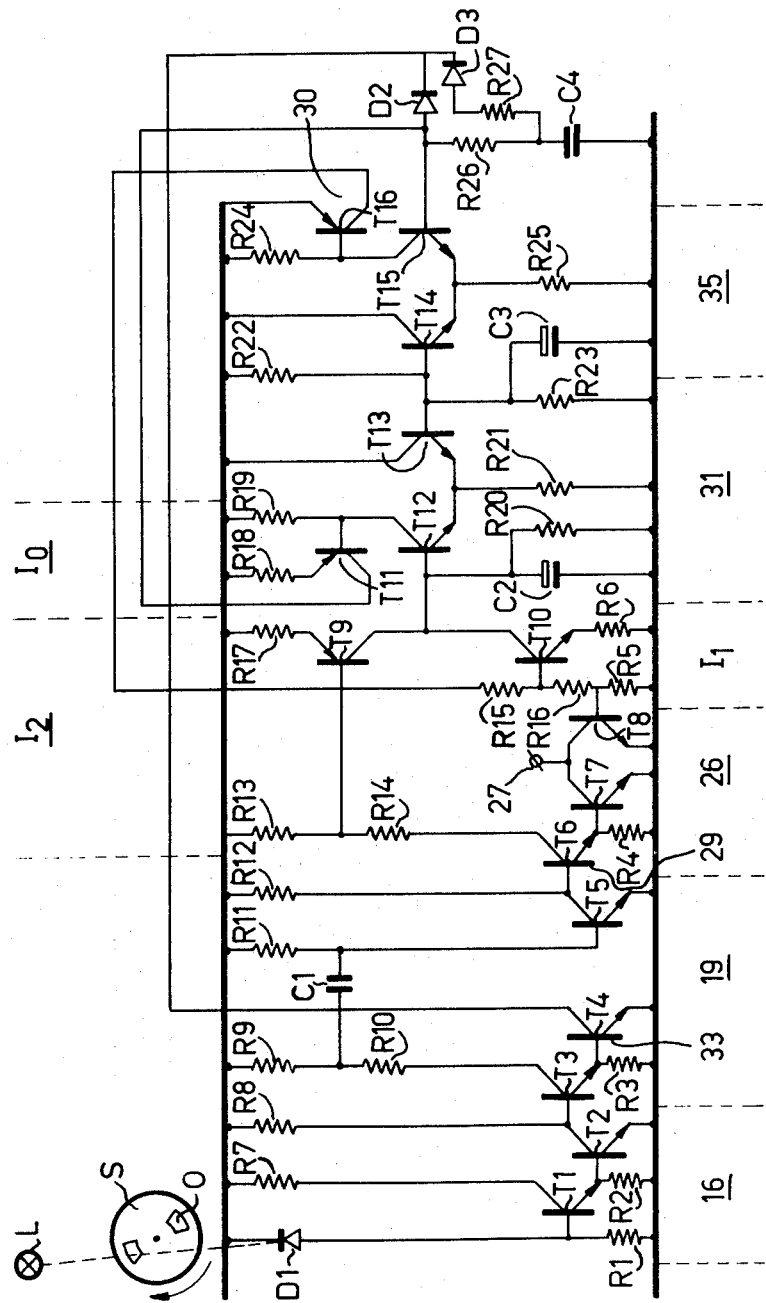

Embodiments of the invention will now be described, by way of example, with reference to the accompanying diagrammatic drawings, in which:

FIG. 1 is a block-schematic diagram of a known ignition system for an internal combustion engine, FIG. 2 is a block-schematic diagram of the advancing part according to the invention, FIG. 3 shows a special embodiment of this advancing part, FIG. 4 is the circuit diagram of the time delay circuit and the pulse width comparison device, and FIG. 5 is the circuit diagram of a practical embodiment of the system according to the invention.

Referring now to FIG. 1, reference numeral 1 symbolically indicates the crankshaft or the camshaft of an internal combustion engine. This shaft has a mark or cam 2, which at the point indicated by the arrow 3 transmits the position of the shaft to a control mechanism 4 for operating a contact breaker 5. The top dead centre associated with a given combustion chamber of the engine is designated by the reference letter A. An arrow 8 indicates the direction of rotation of the shaft 1. From these elements shaft information 9 is transmitted to the control mechanism 4, enabling this mechanism to shift the arrow 3 over a path 11 so as to ultimately enable the contact breaker 5 to be opened at the correct instant in accordance with the speed of the shaft 1. At a low shaft speed the arrow 3 is arranged close to point A and at a high speed far from A. Owing to the contact breaker 5 opening, a high-voltage generator 6 generates a high voltage, of, say, 20 kilovolts which is applied to a distributor 7 to produce a spark at the appropriate plug 12 associated with a given combustion chamber having its individual ignition instant. For this purpose, the rotation information from the shaft 1 is applied to the distributor 7 at 10.

FIG. 2 is a block schematic diagram of the advancing part of the ignition system for timing the ignition according to the invention. In FIG. 1, this part is shown in the known system by the control mechanism 4 with the path 11, the arrow 3 and the speed information 9.

In FIG. 2, the crankshaft pickup comprises parts 13, 14 and 15. During the compression stroke a first position determination of the piston in the cylinder is symbolically indicated by an angle determination of the crankshaft or camshaft 1, by means of the stationary arrow 13 and the passage of the location of the arrow by the cam 2. This position or angle determination is designed so that at the highest speed the desired ignition instant always lags behind the said passage or coincides with it, for example, when the timing according to the invention is effected in a given speed range. The second position or angle determination is indicated by the arrow 14 arranged close to the top dead centre A. This also enables a fixed ignition advance which may be necessary for starting the engine. The signal generated in 15 is applied to an amplifier or pulse shaper 16 and from this to a delay circuit 17, which transmits the first position determination with a certain time delay to an output 20.

The ignition instant is given by the appearance at the output 20 of the said signal derived from the first position determination. The contact breaker 5 is operated and the high-tension system produces sparks. The signal from the second position determination appears at the output 20 without any time delay. Since the output 20 is connected to a measuring and comparing circuit 18, the time elapsed between the ignition instant and the second position determination may be determined. This period of time is compared in the comparison circuit 18 with a reference quantity from a reference source 19, and when the quantity representing the measured period deviates from the reference quantity the circuit 18 applies, thruogh a lead 21, a control signal to the delay circuit 17 in a sense such as to reduce the deviation to a minimum. When the engine speed increases, the time interval between the tow position determinations is reduced so that the time delay of the circuit 17 will be too large and the duration of the time pulse at 20 will be too short. Through a lead 21 the comparison device 18 applies a signal to the delay circuit 17 which shortens the delay time, with the result that the time pulse at 20 will be longer and again will correspond to the reference quantity.

In the system shown in FIG. 3, the position determination from the crankshaft pickup is applied to a pulse shaper 16 which at its output 23 delivers a squarewave pulse 24. This pulse is applied to a delay circuit 17 which delays the leading edge of the pulse 24 in time. The shortened pulse 25 has a pulse width corresponding to a desired ignition advance. This pulse is applied to an or-gate 26 which transmits the pulse to an output 27 for operating the contact breaker. The pulse 25 is also compared in a pulse duration comparison device 18 with the pulse duration of a pulse 28 from a pulse generator 19, which may be a monostable multivibrator circuit triggered by the trailing edge of the pulse 24. If the pulse duration of the pulse 25 deviates from that of the pulse 28, the comparison device 18 controls the delay circuit 17 in a manner such as to equalize the width of the pulses 25 and 28. The pulse 28 is also applied to an or-gate 26 which transmits it to the output 27. The pulses 25 and 28 are added to one another in time, resulting in a longer pulse 29 being available for the contact breaker. The advantage of this addition is that at the output 27 a signal always appears for operating the ignition system, even if at the starting of the engine the delay circuit 17 has not yet been set owing to the absence of a control signal, so that there may not be a pulse 25.

FIG. 4 shows the circuit diagram of a pulse duration comparison device and a delay circuit which in FIGS. 2 and 3 are designated 18 and 17, respectively. The reference pulse 28 is applied to a switch 29 which, for the duration of the pulse, switches a current supply source $I_2$ into circuit so that a charge $I_2.t_{28}$ is supplied to a capacitor $C_2$. The pulse 25, the width of which corresponds to the desired ignition advance, operates a switch 30 so that a current supply source $I_1$ takes a charge $I_1.t_{25}$ from the capacitor $C_2$.

The capacitor $C_2$ is connected to a first input of a differential amplifier 31, to the second input of which is applied a reference voltage $V_{ref}$ which is determined by $R_{22}$, $R_{23}$ and a supply voltage $V_b$.

According to the difference between this reference voltage and this capacitor voltage the differential amplifier delivers an output current which is shown as a current source $I_0$ and a diode 32. The diode 32 indicates that current is supplied only when the capacitor voltage exceeds the reference voltage.

The delay circuit 17 comprises the series combination of a time capacitor $C_4$ and a resistor $R_{26}$ shunted by a switch 33, which is controlled by a position pulse 24. In the presence of the position pulse the switch 33 is open and the capacitor $C_4$ is charged by the current of the current supply $I_0$. The voltage applied to an input 34 of a differential amplifier 35 has the value $V_{34} = I_0 . R_{26} + I_o.t/C_4$ where $t$ is the time which elapses after the leading edge of the pulse 24.

The voltage at the second input 36 of the differential amplifier 35 is a reference voltage $V_{ref}'$, which is determined by resistors $R_{22}'$ and $R_{23}'$ which may be identical with the resistors $R_{22}$ and $R_{23}$, and by the supply voltage $V_b$. As soon as the voltage at the input 34 exceeds the reference voltage at 36 a sudden voltage variation is produced at the output of the amplifier. Like the diode 32, a diode 37 symbolically indicates the polarity. The sudden voltage variation forms the leading edge of the pulse 25. The trailing edge of the pulse 25 is produced by the sudden voltage drop at the input 34 due to the closure of the switch 33 at the instant of the trailing edge of the position pulse 24.

If now:

$V_{ref}' = V_{ref}$ $T_{24}$ = the duration of the pulse 24, proportional to the speed of the engine.

$t_{17}$ = the delay time of the leading edge of the pulse 24, $t_{28}$ = the reference time, and $t_{25}$ = the desired ignition advance, then:

$$t_{25} = t_{24} - t_{17} \quad (1)$$
$$V_{34} = V_{ref} = I_0 \times R_{26} + I_0 \times t_{17}/C_4 \quad (2)$$
$$I_0 = \text{const} \times [(Q_0/C_2) - V_{ref}] \quad (3)$$

where $Q_0$ is the charge of the storage capacitor $C_2$.
From (2) follows:

$$t_{17} = (V_{ref} \times C_4)/I_0 - R_{26} \cdot C_4 \quad (4)$$

If the circuit has become adjusted we have:

$$I_2 \times t_{28} = I_1 \times t_{25} \quad (5)$$

When the engine speed varies, $t_{24}$ will vary, and since $t_{17}$ still is constant, $t_{25}$ will vary by an amount $\Delta t_{25}$. This provides a variation of the charge on $C_2$:

$$Q_0 = -I_1 \cdot \Delta t_{25} \quad (6)$$

As a result, $I_0$ is changed according to (3) and $t_{17}$ is altered according to (4), so that ultimately $\Delta t_{24}$ will be compensated by $\Delta t_{17}$ and $t_{25}$ will be maintained constant.

A practical embodiment is illustrated in FIG. 5.

The crankshaft pickup comprises components L, S and $D_1$. S is a disc mounted on the crankshaft of a four-cylinder engine. Through openings O which mark the correct angular positioning, light from a light source L is transmitted to a photosensitive diode $D_1$. The amplifier 16 of the preceding Figures comprises transistors $T_1$ and $T_2$. Transistors $T_3$ and $T_5$ together with timing elements $C_1$ and $R_{11}$ constitute a monostable multivibrator circuit 19, which together with $R_9$ and $R_{10}$ is capable of producing a speed-dependent reference pulse. A transistor $T_4$ forms the switch 33 of FIG. 4, a transistor $T_6$ forms the switch 29, and a transistor $T_{16}$ the switch 30. The current source $I_2$ comprises a transistor $T_9$, a resistor $R_{17}$ and voltage divider $R_{13}$, $R_{14}$, and the current source $I_1$ comprises a transistor $T_{10}$, a resistor $R_6$ and a voltage divider $R_{15}$, $R_{16}$ + $R_5$. The current source $I_0$ comprises a transistor $T_{11}$ and resistors $R_{18}$ and $R_{19}$. The differential amplifier 31 comprises transistors $T_{12}$ and $T_{13}$ and a resistor $R_{21}$, and the differential amplifier 35 comprises transistors $T_{14}$ and $T_{15}$ and a resistor $R_{25}$. The or-gate 26 of FIG. 3 comprises transistors $T_7$ and $T_8$. The control signal for the contact breaker or contact breaking circuit of an ignition system is obtained at a common collector terminal 27.

In modified embodiments of the circuit arrangements shown in FIGS. 4 and 5, the capacitors $C_2$ and $C_4$ may be combined with the succeeding amplifiers to form Miller integrators, the capacitors being connected between an input and the output of the respective amplifier. The integrating or accumulating property is retained, however, the advantage is obtained that the capacitor may have a smaller value owing to the amplification factor of the amplifier and because of this smaller value it may have a smaller volume.

Hereinbefore it has been stated that a certain non-linearity may be desirable in the ignition advance angle/speed curve. A solution of the problem of obtaining this non-linearity was given by either adapting the reference period or by having the measurement of the period performed non-linearly, for example, in the circuit of FIG. 4 by continuously charging or discharging the capacitor $C_2$ through current supply circuits or resistors, or by controlling the current supplies $I_1$ and $I_2$ by means of a speed-dependent signal. This signal may be obtained from the output of the amplifier for the pickup signal.

What is claimed is:

1. An apparatus for timing the ignition of an internal combustion engine comprising, a crankshaft transducer for deriving first and second signals representing first and second positions of a cylinder piston in a compression stroke before the instant of ignition and near the top dead center, respectively, an amplifier with an input coupled to the transducer to receive said signals and an output coupled to an input of a time delay circuit, means for coupling the output of the time delay circuit to a device for controlling the operation of the engine ignition contact breaker, means connecting said output to a time measuring circuit which converts the time interval between the ignition instant and the second position determination into a measuring quantity, a reference source which delivers a reference quantity related to the inflammation time of the gas mixture in a cylinder to a first input of a comparison device, means connecting a second input of the comparison device to the output of the time measuring circuit for the measuring quantity, the comparison device having an output for delivering an output signal in accordance with the difference between the reference quantity and the measuring quantity, means connecting the output of the comparison device to a control input of the time delay circuit for controlling the time delay so as to provide compensation.

2. An apparatus for timing the ignition of an internal combustion engine comprising, a crankshaft transducer for deriving a position pulse signal having a leading edge representing a first position of a cylinder piston during a compression stroke before the instant of ignition and a trailing edge representing a second piston position near the top dead center, an amplifier for the position pulse, a time delay circuit connected to the output of the amplifier for delaying the leading edge of the position pulse, a reference pulse generator having a trigger input connected to the amplifier output and arranged to be triggered by the trailing edge of the position pulse to generate a reference pulse the duration of which is related to the inflammation time period of the gas mixture, an OR-gate, a pulse width comparison device, means connecting an output of the reference pulse generator to the or-gate and also to a first input of the pulse width comparison device, means connecting a second input of the comparison device to the output of the time delay circuit, means connecting the output of the time delay circuit to the or-gate, means connecting the output of the pulse width comparison device to a control input of the time delay circuit to control the delay time thereof, and means for coupling the output of the or-gate to a device for operating the engine ignition contact breaker.

3. Apparatus as claimed in claim 2, characterized in that the time delay circuit comprises a timing capacitor and a transistor switch connected to the output of the amplifier and which in the absence of a position pulse short-circuits the timing capacitor, a charging circuit for the timing capacitor which charges the capacitor in the presence of said position pulse, and a difference amplifier which delivers a signal at the output terminal of the delay circuit when the capacitor voltage exceeds a reference voltage.

4. Apparatus as claimed in claim 2, characterized in that the pulse generator comprises a two-stage transistor amplifier including a first transistor in common emitter configuration with its base connected to the output of the position pulse amplifier and the collector-circuit connected by means of a capacitor to a second transistor in common emitter configuration, and the collector circuit of the second transistor includes a terminal from which the reference pulse may be derived.

5. Apparatus as claimed in claim 2 characterized in that the pulse width comparison device comprises two current source circuits, the first of which supplies current to a storage capacitor through a transistor switch connected to the pulse generator, whereas the second current source circuit takes current from the storage capacitor via a second transistor switch connected to the output of the delay circuit, the comparison device further including a differential amplifier with one input terminal connected to the storage capacitor, and the other input terminal connected to a reference voltage.

6. A method of timing the ignition of an internal combustion engine in which a reference quantity is derived that is related to the inflammation time period of the gas mixture and signals are derived from the engine crankshaft related to the position of a piston comprising, using a first of said signals to determine a first position of the piston during the compression stroke and before the instant of ignition, using a second of said signals to determine a second position of said piston near the top dead center of the piston stroke, triggering a time delay circuit by means of said first signal to derive therefrom a time delayed trigger signal for igniting a spark plug, measuring the time period between the delayed trigger signal and said second signal to derive a measuring quantity related thereto, comparing said measuring quantity with said reference quantity and, in the event of a deviation thereof, controlling the delay circuit to adjust the time delay thereof so as to provide a compensation effect, whereby the measuring quantity is caused to match the reference quantity for changes in engine speed.

7. The method of claim 6 comprising the further step of changing the reference quantity so as to change the instant at which the trigger signal occurs.

8. The method of claim 6 comprising the further step of changing the measurment parameters when measuring the time period between the trigger signal and the second signal thereby to change the instant at which the trigger signal occurs.

9. Apparatus as claimed in claim 5 wherein said time delay circuit comprises a timing capacitor and a third transistor switch connected to the output of the differential amplifier, said third transistor switch being responsive to the position pulse so that in the absence of said pulse it short-circuits the timing capacitor, a charge circuit for the timing capacitor that includes a current source output of the differential amplifier and is arranged to charge the timing capacitor when the position pulse is present to open the third transistor switch, and a difference amplifier which delivers a signal at an output terminal of the delay circuit when the timing capacitor voltage exceeds a reference voltage.

10. Apparatus as claimed in claim 2 wherein the crankshaft transducer comprises a disc-shaped part adapted to rotate with the crankshaft and including sectors having arc lengths corresponding to the desired angular positions, and a pick-up member disposed close to the disc-shaped part so as to detect the presence of a sector and thereby derive said position pulse.

11. Apparatus for timing the ignition in an internal combustion engine as a function of engine speed comprising, a crankshaft transducer for deriving first and second signals during the compression stroke of a cylinder piston, the occurrence of the first signal representing a first piston position prior to the instant of ignition and the occurrence of the second signal representing a second later position of the piston near top dead center, a time delay circuit with an input coupled to said transducer and responsive to said first signal to derive a time delayed trigger signal at an output terminal, a comparison device with one input connected to the output of the time delay circuit, a reference source that delivers to a second input of the comparison device an electric reference quantity related to the inflammation time of the gas mixture in a cylinder, means connecting the output of the comparison device to a control input of the time delay circuit which adjusts the delay time thereof, said time delay circuit being operative to supply the second signal to said one input of the comparison device whereby the time interval between the trigger signal and the second signal is measured and compared with the reference quantity related to the inflammation time period to produce a control signal at the output of the comparison device which, in the event of a deviation of the compared time periods, is applied to said delay circuit control input to adjust the delay time of the time delay circuit for said first signal in a sense to compensate for the engine speed, and means for applying the trigger signal at the output of the delay circuit to a device for controlling the operation of the engine ignition contact breaker.

12. Apparatus for timing the ignition in an internal combustion engine as a function of engine speed comprising, a crankshaft transducer for deriving first and second signals during the compression stroke of a cylinder piston, the occurrence of the first signal representing a first piston position prior to the instant of ignition and the occurrence of the second signal representing a second later position of the piston near top dead center, means responsive to said first and second signals for deriving a rectangular waveform signal whose leading and trailing edges correspond to said first and second signals, respectively, a time delay circuit with an input coupled to the output of said waveform signal deriving means and responsive to said rectangular waveform signal to time delay the leading edge thereof and to pass the trailing edge without any time delay, a comparison device with one input connected to the output of the time delay circuit, a reference source that delivers to a second input of the comparison device an electric reference quantity determined by the inflammation time of the gas mixture in a cylinder, means connecting the output of the comparison device to a control input of the time delay circuit which adjusts the delay time thereof as a function of the difference of the input signals to the comparison device and in a sense to reduce said difference to zero by adjusting the delay of the leading edge of the rectangular waveform signal in the appropriate direction, and means for deriving an output signal from the output of the time delay circuit for controlling the engine ignition point in synchronism with the leading edge of the rectangular waveform signal.

* * * * *